US012249924B2

(12) United States Patent
Kimura et al.

(10) Patent No.: US 12,249,924 B2
(45) Date of Patent: Mar. 11, 2025

(54) POWER CONVERSION CONTROL DEVICE

(71) Applicant: Mitsubishi Electric Corporation, Tokyo (JP)

(72) Inventors: Tomohiro Kimura, Tokyo (JP); Yuji Zushi, Tokyo (JP); Shozo Kanzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 17/633,433

(22) PCT Filed: Aug. 23, 2019

(86) PCT No.: PCT/JP2019/032961
§ 371 (c)(1),
(2) Date: Feb. 7, 2022

(87) PCT Pub. No.: WO2021/038617
PCT Pub. Date: Mar. 4, 2021

(65) Prior Publication Data
US 2022/0294364 A1    Sep. 15, 2022

(51) Int. Cl.
*H02M 1/08*    (2006.01)
*H02M 1/088*    (2006.01)
(Continued)

(52) U.S. Cl.
CPC .......... *H02M 7/537* (2013.01); *H02M 1/088* (2013.01); *H02M 3/33523* (2013.01); *H02P 27/06* (2013.01)

(58) Field of Classification Search
CPC ........ H02M 1/08; H02M 1/088; H02M 3/335; H02M 7/537; H02M 3/1582; H02M 7/5387; H02P 27/06; H02P 29/032
See application file for complete search history.

(56) References Cited

U.S. PATENT DOCUMENTS 9,744,857 B2 *  8/2017  Eifert ...................... B60L 53/14
10,916,957 B2 *  2/2021  Tanaka .............. H01M 10/0525
(Continued)

FOREIGN PATENT DOCUMENTS

JP    2013-192332 A    9/2013
JP    2016-149935 A    8/2016
(Continued)

OTHER PUBLICATIONS

Communication dated Aug. 2, 2022, issued in Japanese Application No. 2021-541755.
(Continued)

*Primary Examiner* — Thai T Dinh
(74) *Attorney, Agent, or Firm* — Sughrue Mion, PLLC (57) ABSTRACT

An electrical power conversion control device of an electric automotive vehicle is obtained which is small in size and inexpensive with lower electric current consumption. In the power conversion control device, insulating power sources are each connected to gate drive circuits to form respective pairs therebetween; electric power whose voltage is regulated as a constant voltage by way of a constant-voltage circuit is supplied from a low-voltage battery to a low-voltage side of an insulating communications circuit, and a high-voltage side of the insulating communications circuit is operated by an insulating power source being at least one insulating power source among the insulating power sources; and a signal of a voltage of a high-voltage battery is insulated from the high-voltage side of the insulating communications circuit and transmitted therefrom to the low-voltage side thereof.

3 Claims, 6 Drawing Sheets

(51) Int. Cl.
    *H02M 3/335*     (2006.01)
    *H02M 7/537*     (2006.01)
    *H02P 27/06*     (2006.01)
    *H02P 29/032*    (2016.01)

(56) References Cited

U.S. PATENT DOCUMENTS

| | | | |
|---|---|---|---|
| 11,173,788 B2 * | 11/2021 | Jin | ........................ G01R 31/52 |
| 2015/0329001 A1 * | 11/2015 | Eifert | ........................ B60L 1/00 |
| | | | 320/109 |
| 2018/0331616 A1 | 11/2018 | Hirakata et al. | |
| 2019/0210481 A1 | 7/2019 | Ishida et al. | |
| 2020/0220489 A1 | 7/2020 | Nakamura et al. | |
| 2021/0039520 A1 * | 2/2021 | Jin | ........................ H02J 7/00308 |

FOREIGN PATENT DOCUMENTS

| | | | | | |
|---|---|---|---|---|---|
| JP | 2017208912 | A | * | 11/2017 | |
| JP | 2018057225 | A | * | 4/2018 | |
| JP | 2019122207 | A | * | 7/2019 | ............ B60L 3/0046 |
| WO | 2018/030381 | A1 | | 2/2018 | |
| WO | 2019/059292 | A1 | | 3/2019 | |

OTHER PUBLICATIONS

International Search Report for PCT/JP2019/032961 dated Oct. 1, 2019 [PCT/ISA/210].
Written Opinion for PCT/JP2019/032961 dated Oct. 1, 2019 [PCT/ISA/237].
Chinese Office Action dated Nov. 3, 2023 in Application No. 201980098118.3.

* cited by examiner

POWER CONVERSION CONTROL DEVICE

CROSS REFERENCE TO RELATED APPLICATIONS

This application is a National Stage of International Application No. PCT/JP2019/032961 filed Aug. 23, 2019.

TECHNICAL FIELD

The disclosure of the present application relates to an electrical power conversion control device for use in an electric automotive vehicle.

BACKGROUND ART

In general, an electric automotive vehicle such as an electric motor vehicle, a hybrid motor vehicle or the like mounts on alternating-current (AC) rotating electric machines as driving-movement sources of the automotive vehicle. To the AC rotating electric machines, electric power is supplied by means of a power conversion control device.

In the power conversion control device, electrically insulated are a control circuit related to the control of an automotive vehicle which utilizes as its electric power source a low-voltage battery, and a drive circuit(s) related to driving-movement of the automotive vehicle which utilizes as its electric power source a high-voltage battery, therebetween.

In order to perform the transmission of a signal(s) between the control circuit on a low-voltage side and the drive circuit(s) on a high-voltage side while being insulated therebetween, it is necessary to provide an insulating communications circuit for electrically enabling the communications between the low-voltage side and the high-voltage side. Because electric power sources are required for the low-voltage side of the insulating communications circuit and for the high-voltage side thereof between which they are mutually isolated or insulated, it is necessary to secure an insulation distance determined in advance between a low-voltage power source being a principal electric power source of an insulating power source and a high-voltage power source(s), which becomes thus a factor responsible for making the construction of a power conversion control device itself larger in its size.

As a means to solve those problems described above, it is proposed in Patent Document 1 described below that a system is reliability protected at the time of an occurrence of abnormality therein while an electric power source, an electric power-source generation circuit and the like are made to be redundant at the irreducible minimum with their requirement.

For example, it is indicated in Patent Document 1 that an insulating power source is diverted for its own uses. Electric power-source supply paths of an insulating power source are branched into two ways, and the power source is diverted for its own uses in an electrical discharge-use drive circuit being a supply destination and in a lower-arm-side drive circuit being another supply destination, so that the redundancy of the insulating power source is implemented.

RELATED ART DOCUMENT

Patent Document

[Patent Document 1] International Publication No. WO2018/030381

SUMMARY OF THE INVENTION

Problems to be Solved by the Invention

However, in Patent Document 1, no mention is made relating to individual operations of insulating power sources, and it cannot be said that the consideration is sufficiently given with respect to electric power saving, to the construction in small size and to lower costs, which are susceptible to improvements.

The present disclosure of the application concerned has been directed at solving those problems as described above, and an object of the disclosure is to provide an electrical power conversion control device which is small in its size and inexpensive with its lower electric current consumption.

Means for Solving the Problems

An electrical power conversion control device disclosed in the disclosure of the application concerned is a power conversion control device in which a high-voltage side connected to a high-voltage battery being used as a driving-movement power source of an electric automotive vehicle and a low-voltage side connected to a low-voltage battery being used as a control power source of the electric automotive vehicle or to a low-voltage power source being produced by performing buck conversion of a voltage from that of the high-voltage battery are electrically insulated therebetween, and in which a processing unit being included on the low-voltage side performs the control on insulated-gate transistors, for use in driving a three-phase motor, to convert direct-current power on the high-voltage side into alternating-current power or to convert alternating-current power from the three-phase motor being generated thereby into direct-current power. The power conversion control device comprises: a constant-voltage circuit being included on the low-voltage side, to which electric power is supplied from the low-voltage battery or from the low-voltage power source; the processing unit being included thereon, to which electric power whose voltage is regulated as a constant voltage is supplied from the constant-voltage circuit; three-phase motor's gate drive circuitry being included on the high-voltage side, having a plurality of insulated-gate transistors for converting direct-current power obtained from the high-voltage battery into alternating-current power; and a voltage measurement circuit being included thereon, for measuring a voltage of the high-voltage battery. The power conversion control device further comprises: a plurality of insulating power sources each being placed to bridge between the low-voltage side and the high-voltage side, to which electric power is supplied from the low-voltage battery or from the low-voltage power source, for outputting a constant voltage to the high-voltage side; gate drive circuits each being placed to bridge therebetween, for controlling the gates of the plurality of insulated-gate transistors in accordance with an instruction(s) from the low-voltage side; and an insulating communications circuit being placed to bridge therebetween, for insulating a measurement value of the voltage measurement circuit and for transmitting the measurement value thereof to the low-voltage side, wherein the insulating power sources are each connected to the gate drive circuits to form respective pairs therebetween; electric power whose voltage is regulated as a constant voltage is supplied to the low-voltage side of the insulating communications circuit from the low-voltage battery by way of the constant-voltage circuit, and the high-voltage side of the insulating communications circuit is operated by at least one of the insulating power sources; and a signal of the voltage of the high-voltage battery is insulated from the high-voltage side and is transmitted therefrom to the low-voltage side.

Effects of the Invention

According to the power conversion control device disclosed in the disclosure of the application concerned, an insulating power source of the insulating communications circuit can serve double duty with an insulating power source(s) of the gate drive circuits, and thus, it is possible to configure a power conversion control device which is small in its size and inexpensive, whereby enabling to obtain it with its lower electric current consumption.

EMBODIMENTS FOR CARRYING OUT THE INVENTION

Hereinafter, the explanation will be made referring to the figures for embodiments of power conversion control devices. In each of the figures, the explanation will be made in such a way that the same or corresponding items, portions or parts designate the same reference numerals and symbols.

Embodiment 1

Figure 1:
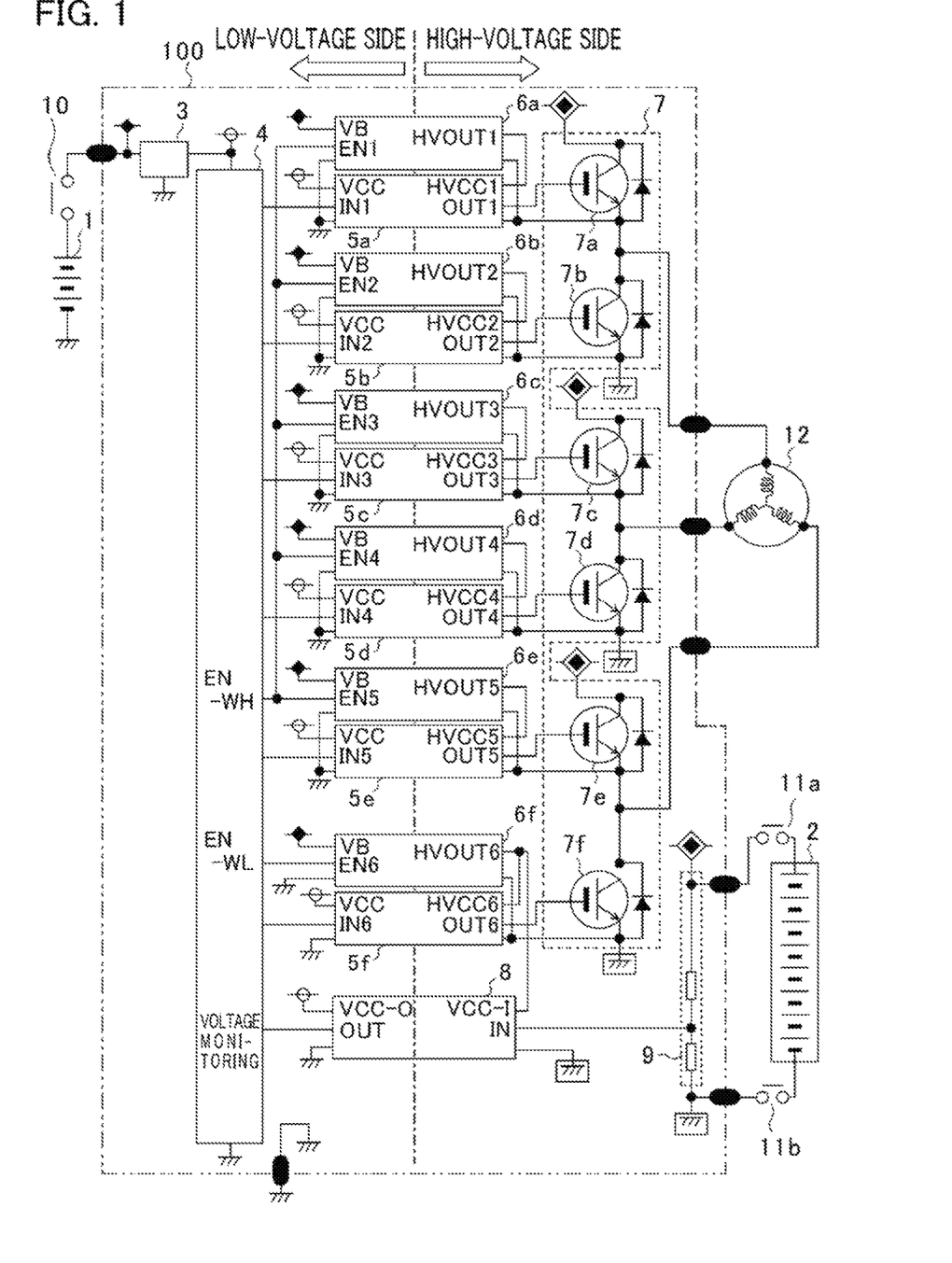
FIG. 1 is an overall circuit block diagram illustrating a power conversion control device according to Embodiment 1.
Figure 2:
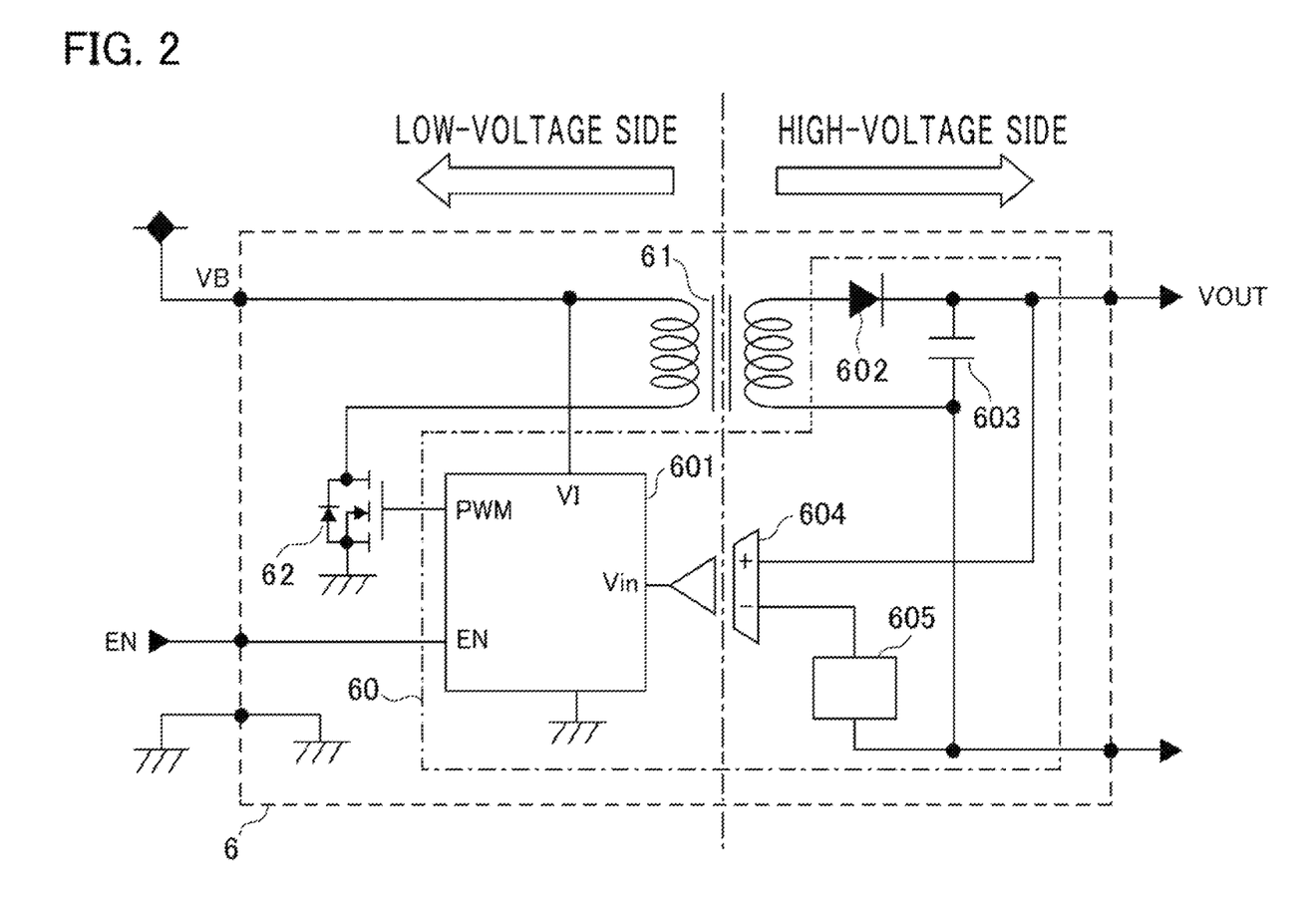
FIG. 2 is a schematic diagram illustrating an example of an insulating power source in the power conversion control device according to Embodiment 1.

FIG. 1 is an overall circuit block diagram illustrating a power conversion control device 100 according to Embodiment 1. FIG. 2 is a schematic diagram illustrating an example of an insulating power source in the power conversion control device 100.

In FIG. 1, a low-voltage side on which a low-voltage battery 1 is provided as an electric power source and a high-voltage side on which a high-voltage battery 2 is provided as an electric power source are electrically insulated therebetween, and the power conversion control device 100 is constituted of a voltage-regulator or constant-voltage circuit 3, a processing unit 4, gate drive circuits 5a to 5f, insulating power sources 6a to 6f, insulated-gate transistors 7a to 7f, an insulating communications circuit 8 and a voltage measurement circuit 9. Three-phase motor's gate drive circuitry 7 is constituted of the insulated-gate transistors 7a to 7f.

In addition, the low-voltage side of the power conversion control device 100 may be connected to a low-voltage power source thereof which is produced by performing buck conversion of a voltage from that of the high-voltage battery 2.

Note that, on an as-needed basis, sensors such as a temperature sensor, an electric current sensor and the like, and another control circuit and the like may appropriately be connected to the power conversion control device, while those are not diagrammatically shown in FIG. 1.

The low-voltage battery 1 being an electric power source on the low-voltage side is connected to the power conversion control device 100 by way of a switch 10, and is connected thereby to the constant-voltage circuit 3 in the interior of the power conversion control device 100 and to the insulating power sources 6a to 6f therein.

Note that, without directly connecting to the constant-voltage circuit 3 and to the insulating power sources 6a to 6f, they may appropriately be connected to the low-voltage battery by way of a diode(s) and/or a coil(s).

The constant-voltage circuit 3 controls electric power supplied from the low-voltage battery 1 to achieve a voltage determined in advance, which is outputted from an output terminal of the constant-voltage circuit.

The output terminal of the constant-voltage circuit 3 is connected to a power-source terminal of the processing unit 4, low-voltage-side power-source terminals of the gate drive circuits 5a to 5f each, and a low-voltage-side power-source terminal of the insulating communications circuit 8; and so, the constant-voltage circuit 3 is used as the electric power source for the processing unit 4, each of the gate drive circuits 5a to 5f, and the insulating communications circuit 8.

A configuration may appropriately be applied in which low-voltage side power sources of the gate drive circuits 5a to 5f and an electric power source of the insulating communications circuit 8 are directly supplied from the low-voltage battery 1, for example, without the intervention of the constant-voltage circuit 3.

Meanwhile, the insulating power sources 6a to 6f are each configured as electric power sources which are electrically insulated from their low-voltage sides, and are configured to output electric power applied to power-source terminals of those insulating power sources to their high-voltage sides each by means of DC-to-DC conversions.

As an example of the insulating power sources 6a to 6f each, the configuration of a switching mode power source of flyback scheme is indicated; however, it may be appropriate in applying another scheme such as a forward scheme, a full-bridge scheme, or the like.

The insulating power sources 6a to 6f have so-called enabling terminals EN1 to EN6 by each of which determination is performed whether the operations as an electric power-source circuit are made effective or not, and those terminals are connected to the processing unit 4, so that it is possible to arbitrarily control the operations as the electric power sources in accordance with control signals from the processing unit 4.

Output terminals HVOUT1 to HVOUT6 of the insulating power sources 6a to 6f are connected to high-voltage-side power-source terminals HVCC1 to HVCC6 of the gate drive circuits 5a to 5f, so that those insulating power sources are used as electric power sources of the gate drive circuits 5a to 5f, respectively.

Into terminals IN1 to IN6 being input portions of the respective gate drive circuits 5a to 5f, gate drive signals from the processing unit 4 are inputted.

The gate drive circuits 5a to 5f perform outputs from respective terminals OUT1 to OUT6 in accordance with gate drive signals inputted from each of the terminals IN1 to IN6.

The three-phase motor's gate drive circuitry 7 is connected to the high-voltage battery 2 by way of switches 11a and 11b such as a relay or the like, and performs a DC-to-AC conversion by using electric power obtained from the high-voltage battery 2 as an electric power source, and by intermittently operating the conversion on the bases of signals outputted from the respective gate drive circuits 5a to 5f; and thus, the three-phase motor's gate drive circuitry supplies the electric power to a three-phase motor 12 connected outside of the power conversion control device 100.

Note that, the processing unit 4 residing on the low-voltage side performs the control on the respective insulated-gate transistors 7a to 7f, for use in driving the three-phase motor 12, which perform the conversion of direct-current (DC) power on the high-voltage side into alternating-current (AC) power, or perform the conversion of AC power from the three-phase motor 12, being regenerated thereby, into DC power.

FIG. 2 illustrates an example of an insulating power source whose configuration will be explained in detail.

In FIG. 2, an insulating power source 6 shows as a representative of the insulating power sources 6a to 6f in FIG. 1 each, and is principally constituted of a transformer 61, a transistor 62 and an insulating power-source circuit 60 including an output voltage monitoring circuit. Note that, the insulating power-source circuit 60 is constituted of a controller 601, a reverse blocking diode 602, a capacitor 603, an addition-subtraction calculation unit 604 and a determination unit 605.

According to the insulating power source 6, it is so arranged that an output voltage thereof is stabilized and outputted by means of the transformer 61 and by means of the insulating power-source circuit 60 in which their low-voltage sides and their high-voltage sides are electrically insulated therebetween, whereby the output voltage is externally transmitted.

In the insulating power-source circuit 60, it is so arranged that electric power is supplied from the low-voltage side to the high-voltage side by means of induced energy produced in the transformer 61 when the transistor 62 is intermittently driven, and also by means of the capacitor 603 which is charged by way of the reverse blocking diode 602 included in the insulating power-source circuit 60.

The insulating power source has the insulating power-source circuit to which electric power is supplied from a low-voltage battery or from a low-voltage power source, a transformer by which electric power is transformed from its low-voltage side into its high-voltage side, and a transistor for controlling the transformer; and so, the transistor operates by means of the electric power which is supplied from the low-voltage battery or from the low-voltage power source, whereas the supply of electric power is halted in accordance with an instruction of the processing unit.

An electric power source being supplied to the three-phase motor's gate drive circuitry 7 is detected by means of the voltage measurement circuit 9; and a signal being detected thereby is inputted into an input terminal IN of the insulating communications circuit 8, and a signal is outputted, on a basis of the signal having been inputted thereinto, from a low-voltage-side output terminal OUT as an analog signal or digital signal, which is inputted into the processing unit 4.

The voltage measurement circuit 9 is a circuit for measuring an input voltage to the three-phase motor's gate drive circuitry 7 in order to perform the control on AC power supplied to the three-phase motor during the running of an automotive vehicle.

Figure 3:
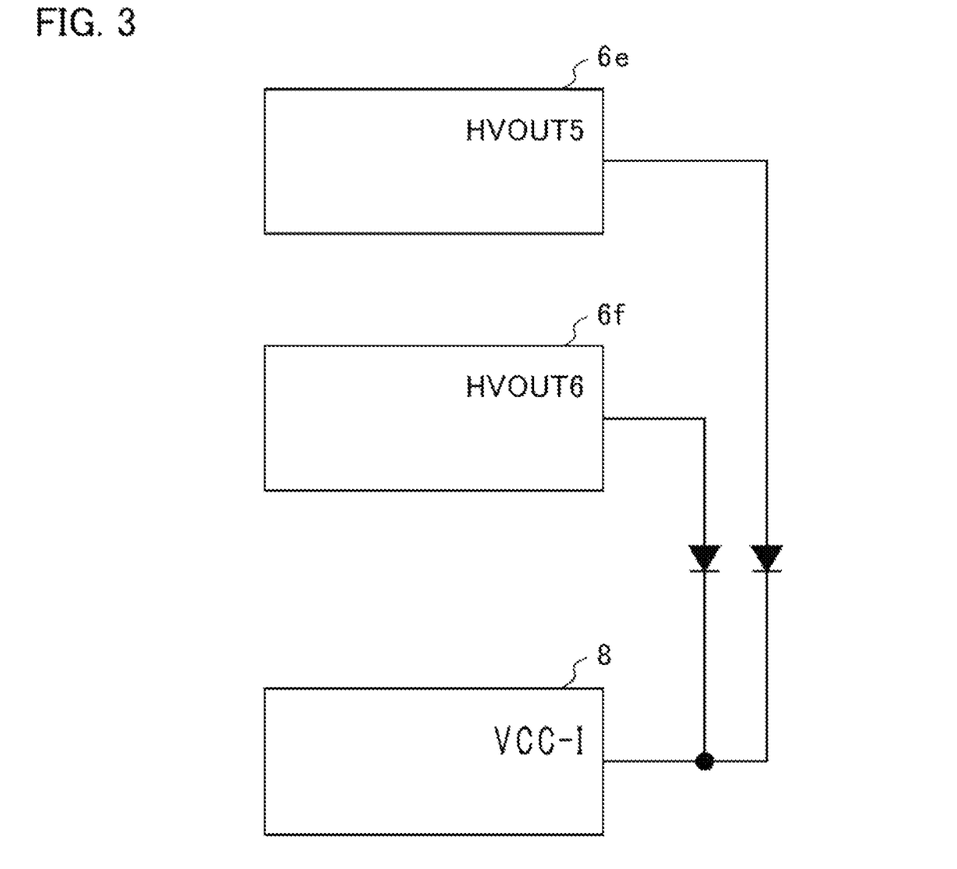
FIG. 3 is a partially schematic diagram illustrating a modification example between insulating power sources and an insulating communications circuit in the power conversion control device according to Embodiment 1.

To a power-source terminal VCC-I on the high-voltage side of the insulating communications circuit 8, its electric power source is supplied from at least one insulating power source among the insulating power sources 6a to 6f; and so, in FIG. 1, the electric power source is supplied by connecting the output terminal HVOUT6 of the insulating power source 6f for use in the gate drive circuit 5f to the power-source terminal VCC-I of the insulating communications circuit 8; however, for example, it is also justifiable in supplying to it from an insulating power source for use in another gate drive circuit. Moreover, as indicated in FIG. 3, it is also justifiable in commonly using a plurality of such insulating power source 6e and insulating power source 6f, and in together connecting them to the power-source terminal VCC-I of the insulating communications circuit 8, so that those power sources are supplied to it.

However, it is desirable to supply as an electric power source of the insulating communications circuit 8 whose reference voltage potential is capable of taking on the same voltage potential as an insulating power source(s) for use in any one of gate drive circuits.

Next, the explanation will be made for the operations of the power conversion control device 100 according to Embodiment 1.

In the embodiment, at a time when an automotive vehicle is stopped during a charge or the like of a high-voltage battery or at a time when an insulated-gate transistor(s) does not perform the switching operations other than the time when the automotive vehicle is stopped, and also at the time of a case in which voltage monitoring of the high-voltage battery is necessary, at least one of the insulating power sources is operated, whereby a voltage of the high-voltage battery can be measured by means of the voltage measurement circuit 9.

Here, by transmitting an operation effectiveness signal from the processing unit 4 to the enabling terminal EN6 of the insulating power source 6f of EN-WL phase, electric power is supplied to the insulating communications circuit 8.

On this occasion, by making the operations of other insulating power sources ineffective, it becomes possible to curb the consumption of electric power supplied from the low-voltage battery 1.

In addition, by making the switch 11a and switch 11b in their short-circuit states by means of an external control device not shown in the figures, electric power is supplied to the power conversion control device 100 from the high-voltage battery 2, so that it becomes possible to measure a voltage of the high-voltage battery 2 by means of the voltage measurement circuit 9.

According to the above, Embodiment 1 designates a power conversion control device in which a high-voltage side connected to a high-voltage battery being used as a driving-movement power source of an electric automotive vehicle and a low-voltage side connected to a low-voltage battery being used as a control power source of the electric automotive vehicle or to a low-voltage power source being produced by performing buck conversion of a voltage from that of the high-voltage battery are electrically insulated therebetween, and in which a processing unit being included on the low-voltage side performs the control on insulated-gate transistors, for use in driving a three-phase motor, to convert DC power on the high-voltage side into AC power or to convert AC power from the three-phase motor being generated thereby into DC power. In addition, the power conversion control device comprises: a constant-voltage circuit being included on the low-voltage side, to which electric power is supplied from the low-voltage battery or from the low-voltage power source; and the processing unit being included thereon, to which electric power whose voltage is regulated as a constant voltage is supplied from the constant-voltage circuit. Moreover, the power conversion control device comprises: three-phase motor's gate drive circuitry being included on the high-voltage side, having a plurality of insulated-gate transistors for converting DC power obtained from the high-voltage battery into AC power; and a voltage measurement circuit being included thereon, for measuring a voltage of the high-voltage battery. In addition, the power conversion control device further comprises: a plurality of insulating power sources each being placed to bridge between the low-voltage side and the high-voltage side, to which electric power is supplied from the low-voltage battery or from the low-voltage power source, for outputting a constant voltage to the high-voltage side; gate drive circuits each being placed to bridge therebetween, for controlling the gates of the plurality of insulated-gate transistors in accordance with an instruction(s) from the low-voltage side; and an insulating communications circuit being placed to bridge therebetween, for insulating a measurement value of the voltage measurement circuit and for transmitting the measurement value thereof to the low-voltage side. Moreover, the insulating power sources are each connected to the gate drive circuits to form respective pairs therebetween; electric power whose voltage is regulated as a constant voltage is supplied to the low-voltage side of the insulating communications circuit from the low-voltage battery by way of the constant-voltage circuit, and the high-voltage side of the insulating communications circuit is operated by at least one of the insulating power sources; and a signal of the voltage of the high-voltage battery is insulated from the high-voltage side and is transmitted therefrom to the low-voltage side. Furthermore, in accordance with an instruction(s) of the processing unit, the operations of the insulating power source(s) are halted.

As described above, by individually making the operations of insulating power sources either effective or ineffective by means of the control by the processing unit according to Embodiment 1, it becomes possible to perform voltage monitoring of a high-voltage battery in a state in which the consumption of electric power supplied from a low-voltage battery is curbed, so that it is possible to obtain a power conversion control device of an electric automotive vehicle which is small in size and inexpensive with lower electric current consumption.

In addition, because an insulating power source of the insulating communications circuit serves double duty with an insulating power source for use in a gate drive circuit, it is possible to achieve the configuration which is small in size and inexpensive; and so, the insulating power source for use in a gate drive circuit serving the double duty can be standardized as the same constituent element with gate power-source circuits each in all of the upper and lower phases.

Because an electric current consumed by the insulating power source of the insulating communications circuit is predominantly slight in comparison with a gate drive current supplied from the insulating power source for use in the gate drive circuit, electric power consumed by the insulating power source for use in the gate drive circuit during its drive operations does not substantially increase even when the insulating power source for use in the gate drive circuit is served as the insulating power source in use for supplying the insulating communications circuit, so that the costs are not driven up.

Moreover, although electric power consumed by the insulating power source in use for the insulating communications circuit can be said small, constituent elements of insulating circuits, constant-voltage controls and the like are the same as those of the insulating power sources for use in the gate drive circuits, whereas, in a case in which an electric power source in use for supplying the insulating communications circuit is individually provided, workloads are caused in both aspects of costs and mounting spaces. Therefore, in a power conversion control device according to the present disclosure of the application concerned, the double duty is served on an insulating power source in use for supplying an insulating communications circuit with one of insulating power sources for use in gate drive circuits, whereby such an effect can be achieved as saving in both aspects of costs and mounting spaces.

Furthermore, in the power conversion control device according to Embodiment 1, it is possible to perform voltage monitoring of a high-voltage battery by diverting an insulating power source(s) for the own use(s), even when an automotive vehicle is stopped during a charge or the like of the high-voltage battery.

Embodiment 2

Figure 4:
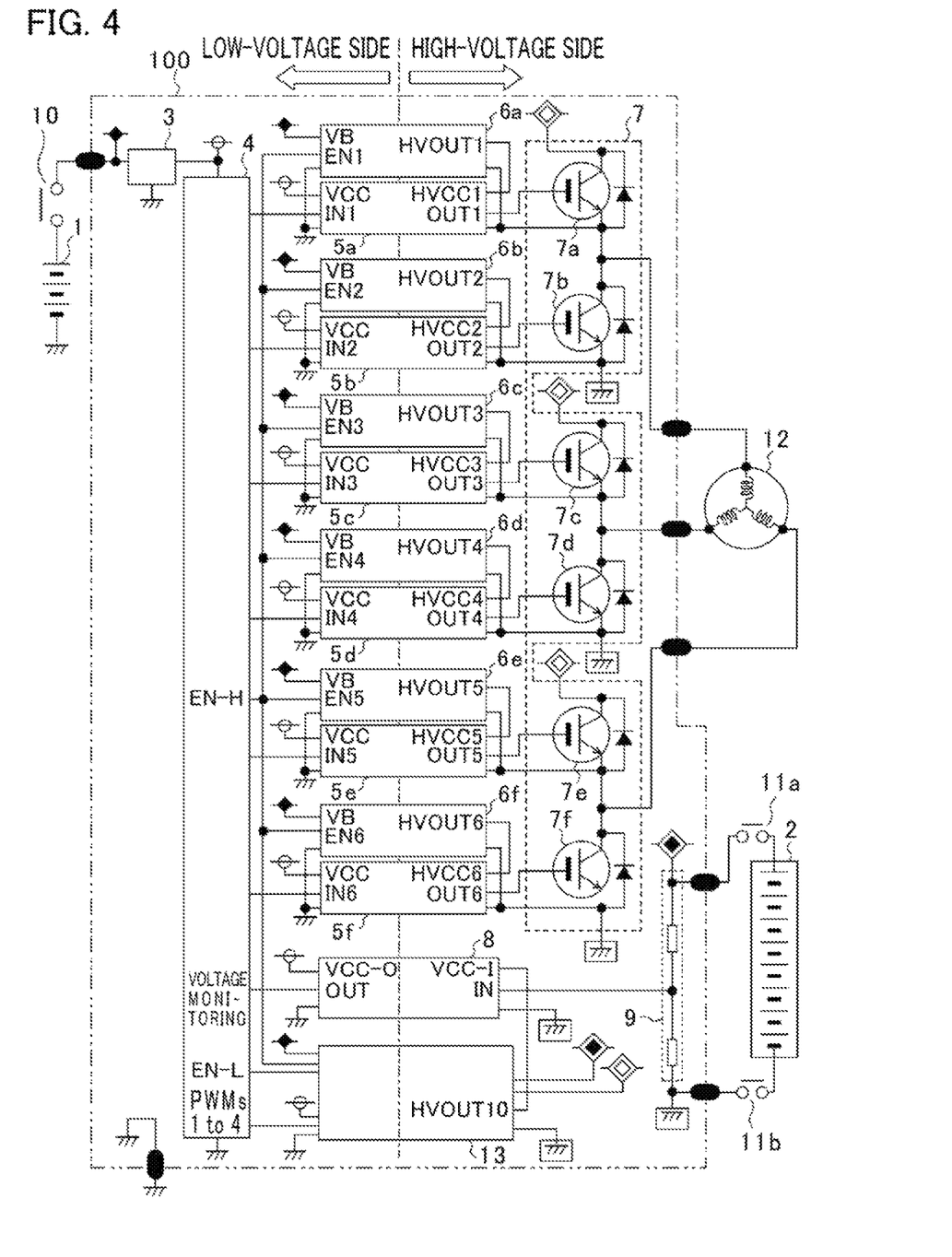
FIG. 4 is an overall circuit block diagram illustrating a power conversion control device according to Embodiment 2.

FIG. 4 is an overall circuit block diagram of such a power conversion control device 100 according to Embodiment 2.

In FIG. 4, the same reference numerals and symbols designate the same items as, or the items corresponding to, those shown in FIG. 1; thus, their explanation is omitted.

In Embodiment 1 described above, the three-phase motor's gate drive circuitry 7 is provided, as its electric power source, with electric power supplied from the high-voltage battery 2; however, the three-phase motor's gate drive circuitry 7 in Embodiment 2 uses, as its electric power source, electric power in which the electric power obtained from the high-voltage battery 2 is stepped up or boosted by means of a step-up or boost circuit 13.

In addition, an insulating power source for operating the insulating communications circuit 8 is included in the boost circuit 13 for boosting a voltage of the high-voltage battery 2.

Figure 5:
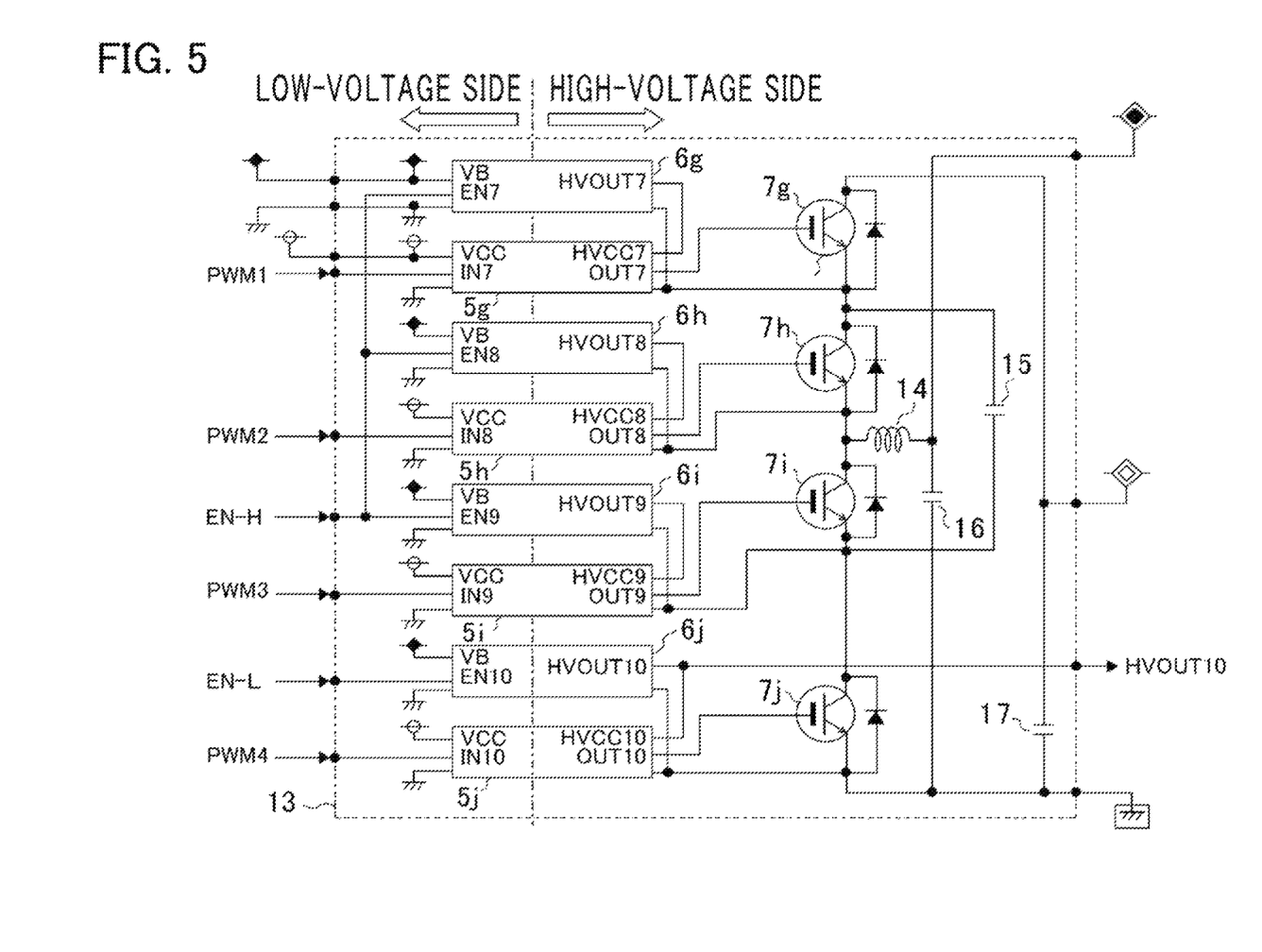
FIG. 5 is a schematic diagram illustrating an example of a boost circuit in the power conversion control device according to Embodiment 2.

FIG. 5 illustrates an example of the boost circuit 13.

In FIG. 5, the boost circuit 13 is principally constituted of an insulating power source 6g through an insulating power source 6j, gate drive circuit 5g through gate drive circuit 5j, an insulated-gate transistor 7g through an insulated-gate transistor 7j, an exciting device 14, a smoothing capacitor 15, a capacitor 16 and a capacitor 17. A low-voltage side and a high-voltage side are electrically insulated therebetween by means of the insulating power source 6g through the insulating power source 6j, and by means of the gate drive circuit 5g through the gate drive circuit 5j, so that stimulated or induced energy produced from the exciting device 14 is charged into the smoothing capacitor 15 by intermittently driving the insulated-gate transistor 7g through the insulated-gate transistor 7j, whereby the voltage boosting is performed.

The boost circuit 13 is a DC-to-DC converter of switched capacitor scheme, which is used in general, and thus the explanation will be omitted for its operations; however, the boost circuit is constituted to include the gate drive circuit 5g through the gate drive circuit 5j, and the insulating power source 6g through the insulating power source 6j, so that they are connected in pairs to form respective columns of four in series.

In Embodiment 1, an electric power source has been supplied to the power-source terminal VCC-I on the high-voltage side of the insulating communications circuit 8 from the output terminal HVOUT6 of the insulating power source 6*f* for use in the gate drive circuit 5*f*; however, in Embodiment 2, an output terminal HVOUT10 of the insulating power source 6*j* for use in the gate drive circuit 5*j* being placed on the lowest layer of the boost circuit 13 is connected to the power-source terminal VCC-I on the high-voltage side of the insulating communications circuit 8, so that the electric power source is supplied thereto from the output terminal HVOUT10.

Because of the arrangement described above, also in Embodiment 2, an insulating power source for use in the measurement serves double duty with one of insulating power sources in use for driving their gates, and also other insulating power sources in use for driving other gates being not in operation can be made ineffective in their operations in accordance with a signal(s) from the processing unit 4; and thus, it becomes possible to obtain a power conversion control device of an electric automotive vehicle which is small in size and inexpensive with lower electric current consumption.

Figure 6:
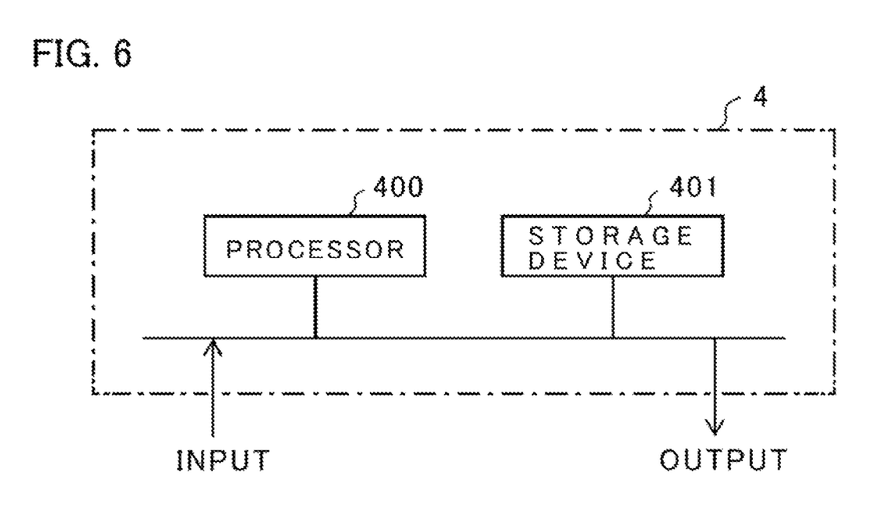
FIG. 6 is a diagram showing an example of a hardware configuration for a processing unit in the power conversion control device according to the embodiments each.

It should be noted that, as an example of hardware is illustrated in FIG. 6, the processing unit 4 is constituted of a processor 400 and a storage device 401. The storage device 401 is provided with a volatile storage device of a random access memory (RAM) or the like, and with a nonvolatile auxiliary storage device of a flash memory or the like, for example. In addition, in place of the flash memory, an auxiliary storage device of a hard disk may be provided with. The processor 400 executes a program(s) inputted from the storage device 401. In this case, the program(s) is inputted into the processor 400 from the auxiliary storage device by way of the volatile storage device. Moreover, the processor 400 may output its data of a calculated result(s) or the like into the volatile storage device of the storage device 401, or may store the data into the auxiliary storage device by way of the volatile storage device.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "1" designates a low-voltage battery; "2," high-voltage battery; "3," constant-voltage circuit; "4," processing unit; "5*a*" to "5*j*," gate drive circuit; "6," "6*a*" to "6*j*," insulating power source; "7," three-phase motor's gate drive circuitry; "7*a*" to "7*j*," insulated-gate transistor; "8," insulating communications circuit; "9," voltage measurement circuit; "13," boost circuit; and "100," power conversion control device.

What is claimed is:

1. A power conversion control device in which a high-voltage side connected to a high-voltage battery being used as a driving-movement power source of an electric automotive vehicle and a low-voltage side connected to a low-voltage battery being used as a control power source of the electric automotive vehicle or to a low-voltage power source being produced by performing buck conversion of a voltage from that of the high-voltage battery are electrically insulated therebetween, and in which a processing device being included on the low-voltage side performs a control on insulated-gate transistors, for use in driving a three-phase motor, to convert direct-current power on the high-voltage side into alternating-current power or to convert alternating-current power from the three-phase motor being generated thereby into direct-current power, the power conversion control device, comprising:

a constant-voltage circuit being included on the low-voltage side, to which electric power is supplied from the low-voltage battery or from the low-voltage power source;

the processing device being included thereon, to which electric power whose voltage is regulated as a first constant voltage is supplied from the constant-voltage circuit;

three-phase motor's gate drive circuitry being included on the high-voltage side, having a plurality of insulated-gate transistors for converting direct-current power obtained from the high-voltage battery into alternating-current power; and a voltage measurement circuit being included thereon, for measuring a voltage of the high-voltage battery, and the power conversion control device, further comprising:

a plurality of insulating power sources each being placed to bridge between the low-voltage side and the high-voltage side, which are controlled respectively to operate in accordance with control signals from the processing device, to which electric power is supplied from the low-voltage battery or from the low-voltage power source, for outputting a second constant voltage to the high-voltage side;

gate drive circuits each being placed to bridge therebetween, for controlling gates of the plurality of insulated-gate transistors in accordance with an instruction from the low-voltage side; and an insulating communications circuit being placed to bridge therebetween, for insulating a measurement value of the voltage measurement circuit and for transmitting the measurement value thereof to the low-voltage side, wherein the insulating power sources are each connected to the gate drive circuits to form respective pairs therebetween;

electric power whose voltage is regulated as the first constant voltage is supplied to the low-voltage side of the insulating communications circuit from the low-voltage battery by way of the constant-voltage circuit, and the high-voltage side of the insulating communications circuit is operated by an assigned insulating power source among the plurality of insulating power sources that are individually controlled by the processing device for making the operation of insulating power source effective and ineffective; and a signal of a voltage of the high-voltage battery is insulated from the high-voltage side and is transmitted therefrom to the low-voltage side.

2. The power conversion control device as set forth in claim 1, wherein said insulating power source for operating the insulating communications circuit is included in a boost circuit for boosting a voltage of the high-voltage battery.

3. A power conversion control device in which a high-voltage side connected to a high-voltage battery being used as a driving-movement power source of an electric automotive vehicle and a low-voltage side connected to a low-voltage battery being used as a control power source of the electric automotive vehicle or to a low-voltage power source being produced by performing buck conversion of a voltage from that of the high-voltage battery are electrically insulated therebetween, and in which a processing device being included on the low-voltage side performs a control on insulated-gate transistors, for use in driving a three-phase motor, to convert direct-current power on the high-voltage side into alternating-current power or to convert alternating-current power from the three-phase motor being generated thereby into direct-current power, the power conversion control device, comprising:

a constant-voltage circuit being included on the low-voltage side, to which electric power is supplied from the low-voltage battery or from the low-voltage power source;

the processing device being included thereon, to which electric power whose voltage is regulated as a first constant voltage is supplied from the constant-voltage circuit;

three-phase motor's gate drive circuitry being included on the high-voltage side, having a plurality of insulated-gate transistors for converting direct-current power obtained from the high-voltage battery into alternating-current power; and a voltage measurement circuit being included thereon, for measuring a voltage of the high-voltage battery, and the power conversion control device, further comprising:

a plurality of insulating power sources each being placed to bridge between the low-voltage side and the high-voltage side, to which electric power is supplied from the low-voltage battery or from the low-voltage power source, for outputting a second constant voltage to the high-voltage side;

gate drive circuits each being placed to bridge therebetween, for controlling gates of the plurality of insulated-gate transistors in accordance with an instruction from the low-voltage side; and an insulating communications circuit being placed to bridge therebetween, for insulating a measurement value of the voltage measurement circuit and for transmitting the measurement value thereof to the low-voltage side, wherein the insulating power sources are each connected to the gate drive circuits to form respective pairs therebetween;

electric power whose voltage is regulated as the first constant voltage is supplied to the low-voltage side of the insulating communications circuit from the low-voltage battery by way of the constant-voltage circuit, and the high-voltage side of the insulating communications circuit is operated by at least one of said insulating power sources; and a signal of a voltage of the high-voltage battery is insulated from the high-voltage side and is transmitted therefrom to the low-voltage side, wherein an operation of said insulating power sources is halted in accordance with an instruction of the processing device, wherein said insulating power sources each have an insulating power source circuit to which electric power is supplied from the low-voltage battery or from the low-voltage power source, a transformer for transforming electric power from the low-voltage side to the high-voltage side, and a transistor for controlling the transformer, and wherein the transistor operates by means of electric power which is supplied from the low-voltage battery or from the low-voltage power source, and halts a supply of electric power in accordance with an instruction of the processing device.

* * * * *